US006210578B1

United States Patent
Sagastume et al.

(10) Patent No.: US 6,210,578 B1
(45) Date of Patent: Apr. 3, 2001

(54) RESIDUAL WATER TREATMENT MICROPLANT FOR SMALL FLOWS

(75) Inventors: Juan Manuel Morgan Sagastume; Adalberto Noyola Robles, both of Mexico City (MX)

(73) Assignee: Universidad Nacional Autonoma de Mexico (MX)

( * ) Notice: Subject to any disclaimer, the term of this patent is extended or adjusted under 35 U.S.C. 154(b) by 0 days.

(21) Appl. No.: 09/431,557

(22) Filed: Oct. 29, 1999

(51) Int. Cl.$^7$ .................................................. C02F 3/30
(52) U.S. Cl. ...................... 210/605; 210/622; 210/151; 210/195.1; 210/252; 210/903
(58) Field of Search .................. 210/150, 151, 210/194, 195.1, 195.3, 196, 197, 202, 605, 622, 624, 903

(56) References Cited

U.S. PATENT DOCUMENTS

| | | | |
|---|---|---|---|
| 3,964,998 | * 6/1976 | Barnard | 210/605 |
| 4,179,374 | * 12/1979 | Savage et al. | 210/151 |
| 4,191,647 | 3/1980 | Mullerheim et al. | 210/128 |
| 4,251,359 | 2/1981 | Colwell et al. | 210/605 |
| 4,465,594 | 8/1984 | Laak | 210/151 |
| 4,488,967 | * 12/1984 | Block et al. | 210/605 |
| 4,552,663 | * 11/1985 | Spector et al. | 210/903 |
| 4,655,925 | * 4/1987 | Tabata et al. | 210/903 |
| 4,867,883 | * 9/1989 | Daigger et al. | 210/605 |
| 4,917,805 | * 4/1990 | Reid | 210/605 |
| 4,948,510 | * 8/1990 | Todd et al. | 210/622 |
| 5,137,636 | * 8/1992 | Bundgaard | 210/903 |
| 5,240,597 | 8/1993 | Ueda | 210/149 |
| 5,342,523 | 8/1994 | Kuwashima | 210/605 |
| 5,462,666 | * 10/1995 | Kimmel | 210/151 |
| 5,534,147 | 7/1996 | Kallenbach et al. | 210/605 |
| 5,650,069 | * 7/1997 | Hong et al. | 210/605 |
| 5,733,456 | * 3/1998 | Okey et al. | 210/195.1 |

OTHER PUBLICATIONS

Juan Francisco Marquez Morales, Rosa Ma, Bautista Farcia, Juan M. Morgan Sagastume and Adalberto Noyola Robles, "Puesta En Marcha De Una Planta De Tratamiento In Situ De Aguas Residuales Para Casas Habitacion," Nov. 4–7, 1997, pp. 490–501.

* cited by examiner

Primary Examiner—Christopher Upton
(74) Attorney, Agent, or Firm—Gardere Wynne Sewell LLP; Sanford E. Warren, Jr.; Edwin S. Flores

(57) ABSTRACT

The invention presents a residual water treatment plant for small flows, characterized by the combination of a primary sedimentation zone followed by anoxic and aerobic packed zones, placed serially all of them, with packing, alternating descending and ascending flows and aerated according to the oxygen requirement, there being a recirculation of treated water with sedimented mud between the secondary sedimentator and the first anoxic compartment or primary sedimentation zone, which produces treated water with enough quality for reutilization activities, after prior disinfecting (for example, watering, automobile-washing, flushing of sanitary facilities, floor-washing, and so forth). The plant requires the use of a low energy consumption air compressor, especially specified to minimize its maintenance and noise. The treatment microplant has a compact design, which requires a small area (of the size of a water cistern for 1100L, 1.5 meters in height), and has an internal water recirculation system, preferably, of the "airlift" type, between compartments, which prevents use of rotatory equipment additional to the compressor, which recycles the accumulated mud by permitting its degradation and minimizing its unloading and production. For purposes of reutilization, the plate requires, additionally, a disinfecting unit and a treated water cistern.

18 Claims, 17 Drawing Sheets

FIG. 1A

| NUMBER | NAME | CRUDE SEWAGE RECEIPT ZONE INSIDE THE BODY OF THE PLANT | ANAEROBIC FILTER | AEROBIC ZONE | SECONDARY SEDIMENTATION |
|---|---|---|---|---|---|
| 1 | AEROCLERE | YES | NO | SUBMERGED FILTER | YES |
| 2 | AEROPAQC | YES | NO | SUBMERGED FILTER | YES |
| 3 | BRIAN | NO | YES (1 ZONE) | NONE | YES |
| 4 | BIOCLERE | YES | NO | PRECOLATOR FILTER | YES |
| 5 | BIOCOMPACT | NO | NO | ACTIVATED MUD | YES |
| 6 | CROMAGLASS | YES | NO | ACTIVATED MUD | YES |
| 7 | FILTACLAREP | YES | NO | PRECOLATOR FILTER | YES |
| 8 | JETBAT | YES | NO | ACTIVATED MUD + SUBMERGED FILTER | YES |
| 9 | NAUTILUS | YES | NO | PRECOLATOR FILTER | YES |
| 10 | NAYADIC | NO | NO | ACTIVATED MUD | YES |
| 11 | SEWPAC | YES | NO | PRECOLATOR FILTER | YES |
| 12 | WP1-HIPAF | YES | NO | SUBMERGED FILTER | YES |
| 13 | PLANT SUBJECT MATTER OF THE APPLICATION | YES | YES (2 ZONES) | SUBMERGED FILTERS (7 ZONES IN SERIES IN THE PREFERRED ARRANGEMENT) | YES |

| WATER RECIRCULATION BETWEEN HIGH-RATE AEROBIC AND ANAEROBIC ZONES (PREFERABLY WITH "AIRLIFT") | NITRIFICATION | DENITRIFICATION | NUMBER OF ROTARY EQUIPMENT SETS INVOLVED | % REMOVAL OF TOTAL DQO | OPERATION MANNER |
|---|---|---|---|---|---|
| NO | YES | NO | 2 | >95 | CONTINUOUS |
| NO | NO | NO | 2 | >95 | CONTINUOUS |
| NO | NO | NO | NONE | 60-80 | CONTINUOUS |
| NO | YES | NO | 3 | >90 | CONTINUOUS |
| NO | YES | NO | 4 | >95 | CONTINUOUS |
| NO | YES | YES | 5 | >95 | LOT |
| NO | NO | NO | 2 | >95 | CONTINUOUS |
| NO | YES | NO | 1 | >95 | CONTINUOUS |
| NO | NO | NO | 3 | >90 | CONTINUOUS |
| NO | NO | NO | 1 | >95 | CONTINUOUS |
| NO | YES | NO | 2 | >95 | CONTINUOUS |
| NO | YES | NO | 1 | >95 | CONTINUOUS |
| YES | YES | YES | 1 (IN THE PREFERRED ARRANGEMENT) | >95 | CONTINUOUS |

FROM FIG. 1A

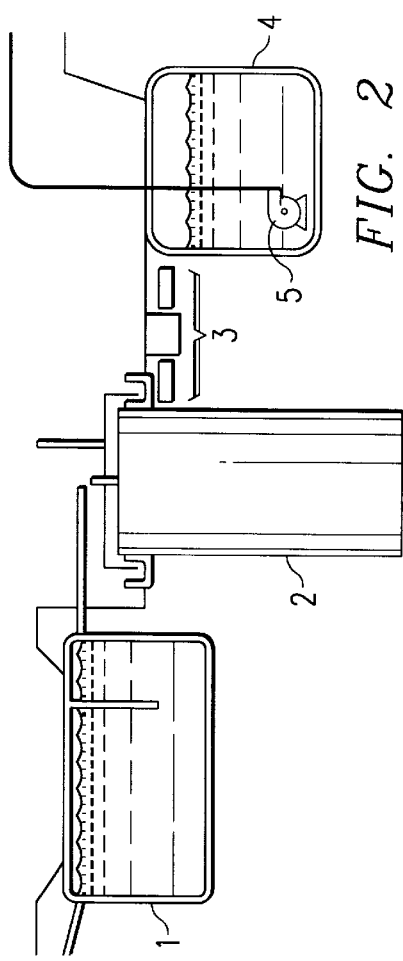
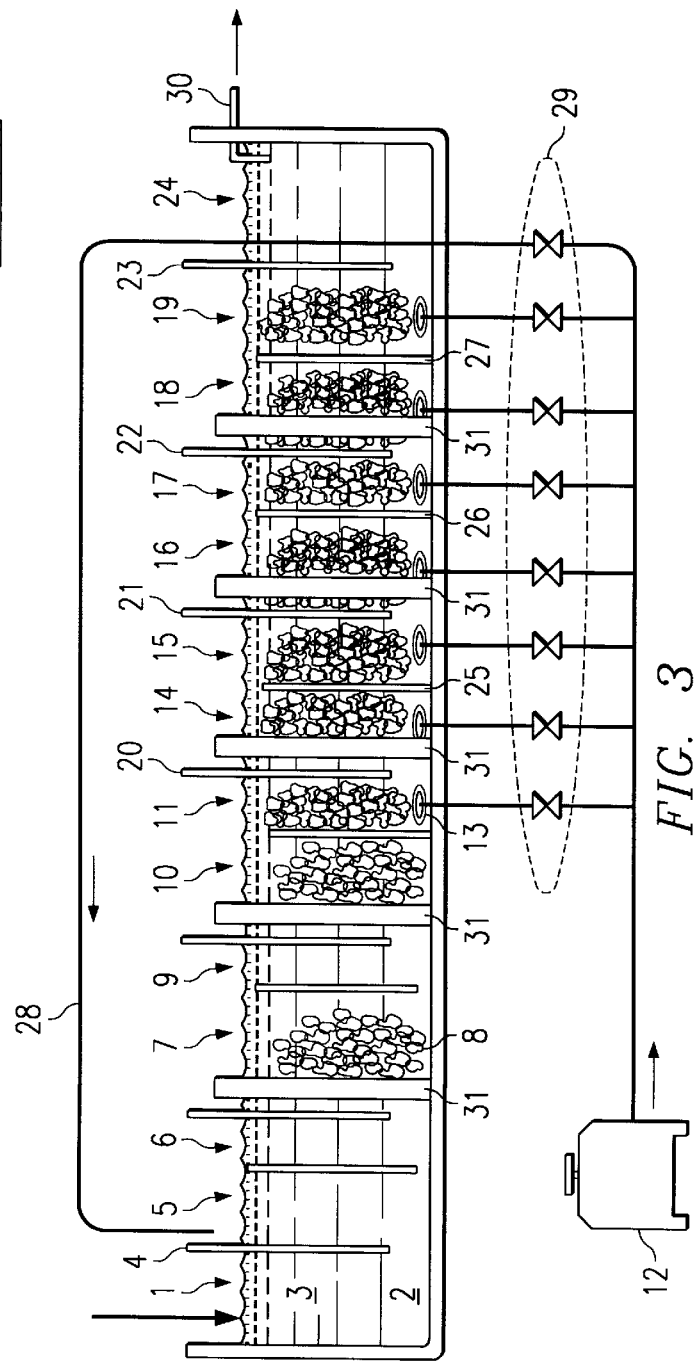

| RESIDUAL WATER FLOW (m³/d) | WATER RECIRCULATION (m³/d) |
|---|---|
| 1 | 2 |
| 2 | 4 |
| 8 | 2 |
| 1 | 2 |
| 5 | 2 |
| 1 | 2 |
| 2 | 4 |
| SIMULATION | 2 |
| 1 (WITH DETERGENTS) | 2 |

|  | 1 | 2 | % REM FROM 1 TO 2 | 3 | % REM FROM 2 TO 3 | % REM FROM 1 TO 3 |
|---|---|---|---|---|---|---|
| pH | 7.37 | 7.40 | - | 7.49 | - | - |
| ALKALINITY (mgCaCO3/L) | 264 | 652 | - | 360 | - | - |
| DQOt (mgO2/L) | 441 | 364 | 17 | 230 | 37 | 48 |
| DQOs (mgO2/L) | 243 | 179 | 26 | 121 | 32 | 50 |
| SST (mg/L) | 148 | 124 | 16 | 24 | 81 | 84 |
| SSV (mg/L) | 133 | 111 | 16 | 22 | 80 | 83 |
| SSF (mg/L) | 15 | 13 | 13 | 2 | 84 | 86 |
| N-NTK (mg/L) | 55 | 30 | 45 | 27 | 10 | 51 |
| N-NH4+ (mg/L) | 18 | 21 | -16 | 21 | 0 | -16 |
| N-NO3- (mg/L) | <2 | <2 | 0 | <3 | - | - |
| N-NO2- (mg/L) | <1 | <0.5 | 50 | <0.5 | - | - |

NOTE: 1: INFLUENT RESIDUAL WATER, 2: EFFLUENT FROM THE FIRST TWO COMPARTMENTS OF THE ANAEROBIC ZONE, 3: EFFLUENT FROM THE TREATMENT PLANT, % REM: REMOVAL PERCENTAGE, -: NO DATUM

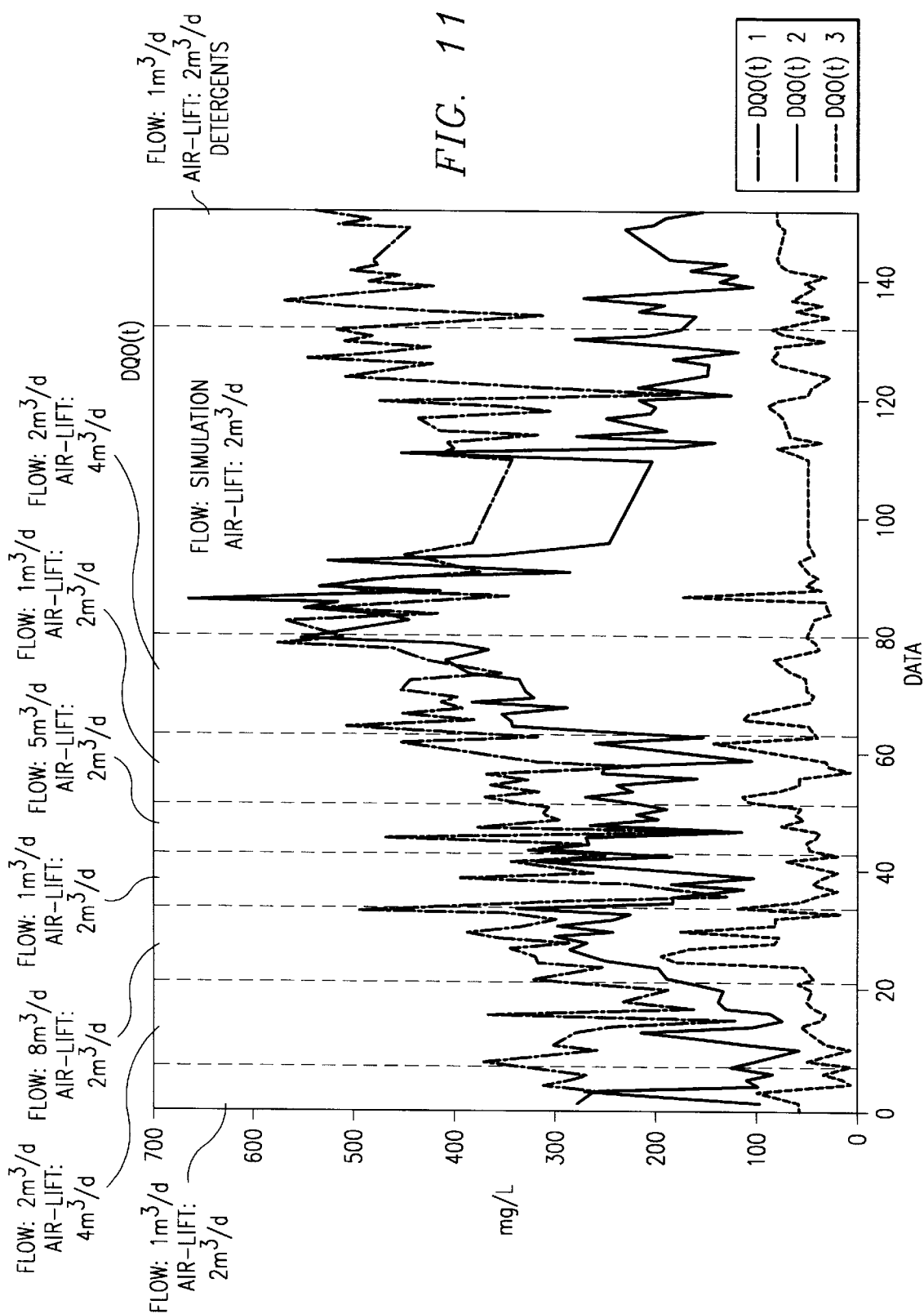

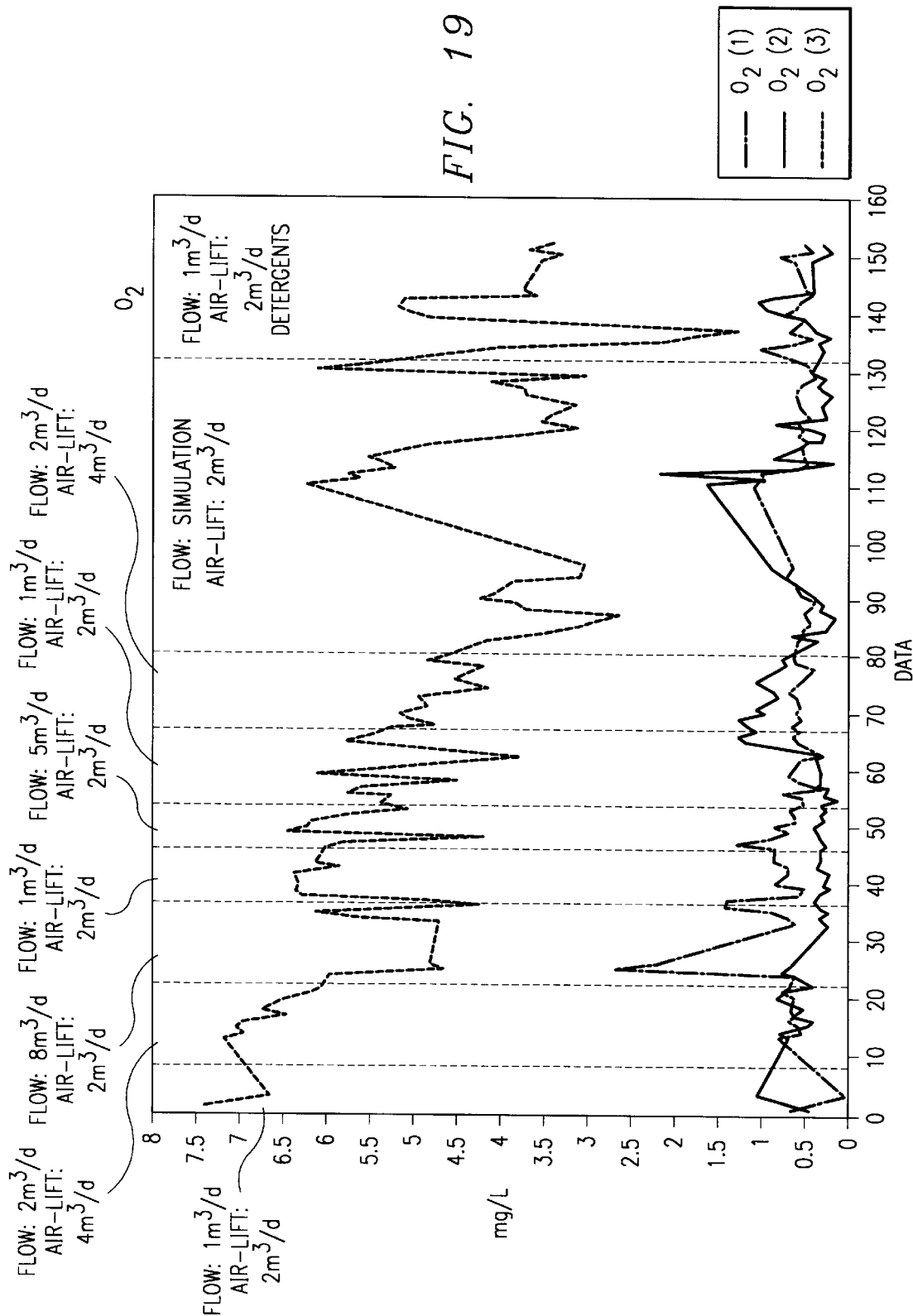

RESIDUAL WATER TREATMENT MICROPLANT FOR SMALL FLOWS

SUMMARY OF THE INVENTION

In the worldwide setting there is the serious problem of how to dispose of residual waters generated in urban, industrial and agricultural centers. In the case of domestic residual waters, the problem becomes worse because part of the population does not have drainage. This situation appears when there it has a high construction cost due to the nature of the terrain, when populated areas grown at a rate higher than urbanization, or in the case of a broad dispersion of residential houses.

In order to limit environmental pollution by the unloading of residual waters, in these cases it is possible to utilize microplants that carry on water treatment at the unloading source. Besides, the demand for this equipment is potentially large, due to future needs of water reutilization.

Although one of the most important applications of microplants resides in the in situ treatment of residual waters from residential houses (preferential application of the invention), these treatment plants may be applied in the same way in condominiums or private homes, sports clubs, hotels and restaurants, offices and shopping malls, hospitals, constructions, or in toll collection booths sanitary facilities on highways, and similar uses. Treatment microplants may be oriented, and such is the case of this invention, towards treated water generation for its reutilization in activities like watering green areas, washing floors, ornamental fountains, washing cars, flushing sanitary facilities, and so forth. With this, considerable savings in drinking water are obtained for first use activities.

The offer of microplants existing on the market does not satisfy entirely the required conditions regarding simplicity of operation, and particularly economic conditions with respect to accessible cost, especially when speaking of an application in a residential home.

Users of this type of treatment plants require that the following titles be considered in the design of this equipment:

The treatment plant should have dimensions permitting its installation and operation at a single family level and/or in places with reduced space and certain margins of growth in case of increase in residual water unloading.

The treatment plant should be economical in its investment and especially in the resources allotted to its operation and maintenance. Treatment efficiency should comply with the standards in force. Preventive and corrective maintenance conditions should be minimal and for the most part capable of being effected by the users themselves.

The treatment plant should not cause inconvenience to the user with respect to bad smells, noise and proliferation of insects and animals in general. In case of need, the facility with minimum additions and complexity should provide treated water for reutilization in the plot of land or inside the house.

On the market there are a variety of package treatment plants. It is difficult for them to comply with all of the requirements outlined above. This invention is oriented towards the satisfactory fulfillment of these requirements.

BACKGROUND OF THE INVENTION

The known background regarding the state of the art in the matter of residual water treatment especially applied for residential houses, refers to systems that involve in their process train septic pits with airy systems, for the most part of the activated mud type, and airy packed zones oriented basically towards elimination of organic matter.

This invention, differing from treatment plants that it is common to find on the market, combines a high rate anaerobic digestion zone by means of two anaerobic filter chambers, followed by a packed aerobic zone, made up of more than two compartments in series, which allow for air conditioning extension in order to carry out nitrification. The treatment plant compartments are designed in such a way as to permit an adequate distribution of the water through the treatment train, diminishing considerably the inactive zones inside the treatment tanks. All compartments are integrated into a compact design that requires little space for its location and facilitates its operation and maintenance.

In order to support the innovative aspects of this invention, we have identified some treatment microplants offered on the market, which may or may not be protected by a patent. FIG. 1 presents the features of these treatment plants, and they are compared to the treatment plant subject matter of this patent application. The information concerning these treatment plants was extracted from their commercial catalogues.

The following Table 1 indicates the patents that were found as background and in force within the state of the art, such as was revealed in a search for the state of the art of U.S. patents.

TABLE 1

U.S. PATENT REFERENCES

| U.S. PAT. NO. | INVENTOR | DATE | TITLE |
| --- | --- | --- | --- |
| U.S. PAT. NO. 4191647 | Mullerheim Williams | March 4, 1980 | Filtration System for Home Drainage |
| U.S. PAT. NO. 4251359 | Colwell Freeman | March 17, 1981 | "In Situ" Residual Water Treatment System |
| U.S. PAT. NO. 4465594 | Laak | Aug. 14, 1984 | Drainage System for Segregated Residual Water Treatment |
| U.S. PAT. NO. 5240597 | Ueda | Aug. 31, 1993 | Residual Water Treatment Equitment |
| U.S. PAT. NO. 5342523 | Kuwashima | Aug. 30, 1994 | Method and Apparatus to Purify Tap Water |
| U.S. PAT. NO. 5534147 | Kallenbach Buchanan Gooddrich Skinner Poncelet Kallenbach | July 9, 1996 | Method and Apparatus to Purify Wastes |

FIG. 1 shows that the great majority of treatment plants have an area for receiving crude sewage residual water inside what is considered the treatment plant in itself, under the framework of a compact design in which a single tank involves the various phases of treatment. In this sense, the plants corresponding to numbers 3, 5 and 10 in FIG. 1 specify a residual water receiving tank or conventional septic pits as a unit extra to what is in itself the package plant for water treatment, which is also a specification of the plant herein described.

No plant, except for plant 3 (FIG. 1), has a treatment zone based on a high-rate anaerobic reactor such as the anaerobic filter. Plant number 3 bases residual water treatment only on an anaerobic treatment, which limits its pollutant removal efficacy. Differently from the other treatment plants, this invention has 2 zones in series, based on anaerobic filters, which provide greater capability to absorb organic crests and limit biological mud production.

On the other hand, it is also possible to observe that most plants base water treatment on aerobic processes only, such as the activated mud, the percolator filter and the submerged filter. Differently from these plants, the plant subject matter of this invention bases its treatment on the combination of high-rate anaerobic and aerobic processes (2 anaerobic filters followed by at least 2 aerated, submerged-filter type zones). These provide versatility for adaptation of the microplant to fluctuating conditions in organic matter concentration, type of pollutants and residual water discharges. These conditions are frequently found in the in situ treatment of residual waters with small flows.

Water recirculation between the aerobic and anaerobic zones in the microplant permits to carry out the partial elimination of nitrogen from water by means of nitrification and denitrification. Plant 6 of FIG. 1 performs nitrification and denitrification, but by means of a completely mixed system of lot operation. The other treatment plants do not report in their respective documents the capability to denitrify, and only some nitrify, which implies ammonia nitrogen oxidation but not elimination of nitrogen from the water.

Plants number 7 and 12 in FIG. 1 effect water and sedimented mud recirculation up to the crude sewage water receipt zone by means of pumps in the first case and an "airlift" system in the second, with the intention of storing and treating the mud. In these arrangements, the substrate-microorganism interaction in a septic pit is poor; therefore, no high yields are accomplished in denitrification. Differently from these plants, the microplant subject matter of this invention establishes a water recirculation current, preferably by means of the "airlift" system, from the aerobic to the anaerobic zone. In these conditions, high-rate anaerobic reactors (2 anaerobic filters) possess adequate substrate-microorganism, which favors the process of denitrification and elimination of suspended and soluble organic matter.

On the other hand, we are mentioning as follows some U.S. patents related to residual water treatment for residential houses, which comprise the years from 1980 until 1996.

U.S. Pat. No. 4,191,647 (1980) refers to a residual water treatment system for in situ treatment in residential houses, which is composed of a filtration unit based on paper and vacuum suction. This separates the solid material from the liquid in the residual water, where the liquid is treated with chemical oxidizers for its further disposal and treatment in the soil, whereas the solids separated from the water and the filtering paper are submitted to a composting process. This treatment system requires area, chemical reagents, a vacuum system, and for the soil to be capable of eliminating the unloaded pollutants. This treatment plan goes a great distance beyond what is expounded in the treatment microplant subject matter of this invention, because the microplant presents a compact design, is based on biological treatment, and promotes the elimination of nitrogen. Besides, digestion of the mud generated is carried out, for the most part, in the treatment microplant.

U.S. Pat. No. 4,251,359 (1981) describes a residual water treatment system based on a conventional septic pit and a sand filter. The treatment system removes suspended material in the septic pit, basically, and dissolved and colloidal organic matter in the sand filter. Both units are in separate tanks. On the other hand, with respect to nitrogen removal, a possible nitrification process inside the filter is mentioned, which implies only oxidation of the ammonia nitrogen but not its elimination as molecular nitrogen. The differences between this patent and the treatment microplant subject matter of this invention, basically, are focused on the treatment process, compact design, and nitrogen elimination capability possessed by the microplant and not the process indicated in the patent.

U.S. Pat. No. 4,465,594 (1984) protects a residual water treatment system for residential houses, which comprises separation of "black" sewage residual waters from "gray" waters. Sewage residual waters go through a retention tank that acts as a septic pit, which is followed by a filter with a base of sand and stones placed on alternate layers inside the filter. The purpose of this is to eliminate organic matter and nitrify. The filter is aerated. The effluent treated water from the filter is mixed with the "gray" water, which previously went through a retention tank. The mixture is deposited in a tank so that the denitrification process will take place. The organic matter necessary for this process is provided by the "gray" water. Differently from this patent, the treatment microplant subject matter of this invention treats in a single compact-design tank the gray and black unloadings from the residential house.

U.S. Pat. No. 5,240,597 (1993) describes a semicompact residual water treatment system for residential houses, involving an anaerobic decomposition phase of the organic matter in a septic pit type compartment, as well as three aerated compartments that work according to the principles of the activated mud system. In the septic pit compartment there is a bomb submerged, whose function is to stir the medium, and certain amounts of fluorine are added, so that, as the patent claims, the solid degradation rate in the septic pit will be increased. In the aerobic zone, the distribution of air is performed by means of a blower and dispersers with different geometry, which in turn are capable of retaining biomass on their surface. A secondary sedimentator and a disinfection unit are specified within the water treatment train, but in separate tanks.

Contrary to the treatment microplant subject matter of this invention, this system does not have the conjunction of the elements of the process train in a single tank. Therefore, it is a semicompact system. Besides, it does not possess nitrogen elimination capability. The aerobic treatment system is based on the activated mud system and not on the series of aerobic submerged filters. For this, there are the ascending and descending alternate flows possessed by the microplant.

U.S. Pat. No. 5,342,523 patent (1994) describes a residual water treatment system for residential houses, consisting of 4 tanks, where the first two (separator tanks) are in parallel and the next two are in series. The parallel separating tanks may be operated alternately (every 6 months), so that only one tank works at a time and until it has become saturated with sedimented and floating mud. When this happens, the residual water begins entering the other separating tank (in parallel) through valves for deviating the residual water. The separator tank, which was saturated with mud, undergoes an air injection until accomplishing complete digestion of the mud. Parallel separator tanks function as conventional septic pits during water income, and as aerobic digesters of mud when the water does not return to the separator tanks. Both separator tanks in parallel are connected to a digestion tube, where the water, arising from any of the two parallel tanks (the one that is in operation), is treated aerobically. Afterwards, the water enters the last tank for its disinfecting.

This patent outlines a half batch type treatment of the residual water, where the residual water is treated continuously and the mud in the lot, through the parallel tanks, whose feeding is controlled by means of valves. Contrary to this patent, the treatment microplant subject matter of this invention possesses a continuous treatment system both of the residual water and the mud produced under a compact design, with the nitrogen elimination included.

U.S. Pat. No. 5,534,147 patent (1996) describes a residual water treatment system with separate tanks for residential houses, consisting of a conventional septic pit, an anaerobic recirculation tank, and an aerated unit for nitrification, packed with stones of granulometry less than ¾". A recirculation current is established between the nitrifying tank and the conventional septic pit. The treatment plant effluent is obtained from the anaerobic tank for recirculation of the water that is discarded into an absorption well.

This plan, contrary to the residual water treatment microplant subject matter of this invention, produces an anaerobic effluent with a greater content of DQO and SST; besides, it has a design that is not compact. Denitrification is carried out in an anaerobic unit tending towards a complete mixture (recirculation tank) and in the septic pit, whose substrate-microorganism interaction is poor.

BRIEF DESCRIPTION OF THE DRAWINGS

FIG. 1 shows a table where a comparison is made between the various microplants commercialized on the market and the microplant subject matter of this invention.

FIG. 2 shows the location of the treatment microplant subject matter of this invention (2) inside the residual water treatment train recommended for its application. The treatment train consists of a conventional septic pit (1), the treatment microplant in question (2), a water disinfection unit (3) that may be based on chlorine or UV light, and finally a treated water cistern (4) with a pump (5). The residual water flows through the process train components by gravity.

FIG. 3 shows only the sequence of water treatment performed inside the treatment plant, in order to facilitate its description and visualization of the arrangement. The numbering shown on this figure is the same as that shown on FIG. 4.

FIG. 11 exhibits the DQOt variation in the influent to the treatment plant (1), in the effluent of the anaerobic filters (2), and in the treated water exit (3) as a function of the discharge variation.

FIG. 19 exposes the O2 variation in the influent to the treatment plant (1), in the effluent of the anaerobic filters (2), and in the treated water exit (3) as a function of the discharge variation.

DETAILED DESCRIPTION OF THE PREFERRED EMBODIMENTS

Flows and Hydraulic Retention Times

The residual water treatment microplant subject matter of this invention may be applied in any flow interval of residual water. The size of the treatment plant may be adjusted as a function of the flow wished to be treated, or otherwise it is possible to use several units of a smaller and of the same size, placed parallel. As many treatment microplants may be located as are necessary to treat the residual water flow in question.

The total hydraulic retention time of the residual water treatment microplant subject matter of this invention oscillates between 16 and 30 hours, preferably 24 hours.

Adaptable Geometries

The treatment process making up the microplant may be adapted in tanks with different geometries; for example, in tanks with a square, rectangular, triangular or any polygonal base whatsoever having "n" sides, and so forth. The preferred arrangement is the one made up of a circular base, which conforms a cylindrical geometry.

Description of the Residual Water Treatment Microplant With the Preferred Geometry (Circular Base, Cylindrical Geometry)

Figure 4:
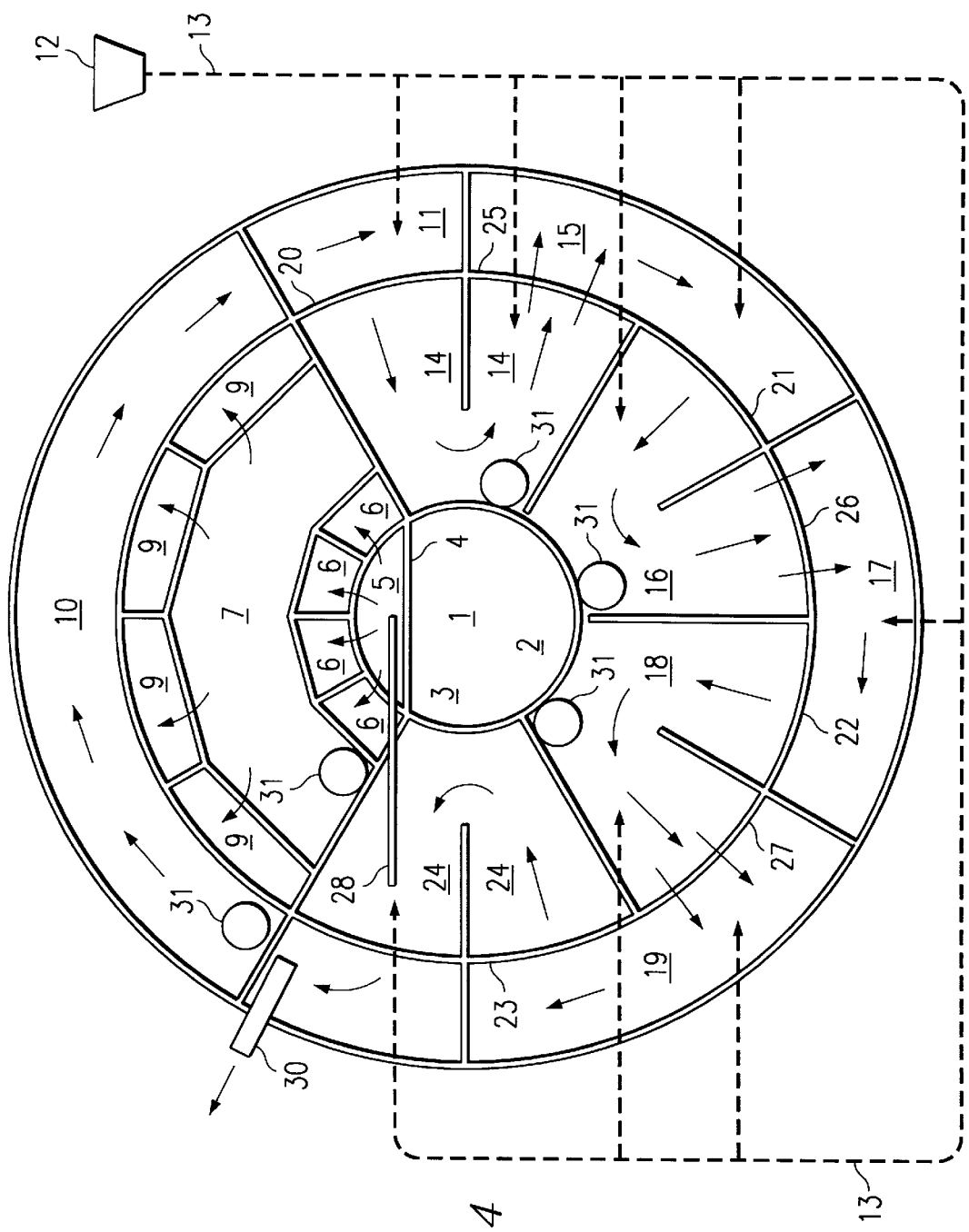
FIG. 4 is a plant view of the treatment plant in its preferred geometry. The numbering shown on FIG. 3 is the same as that shown in this figure.
Figure 5:
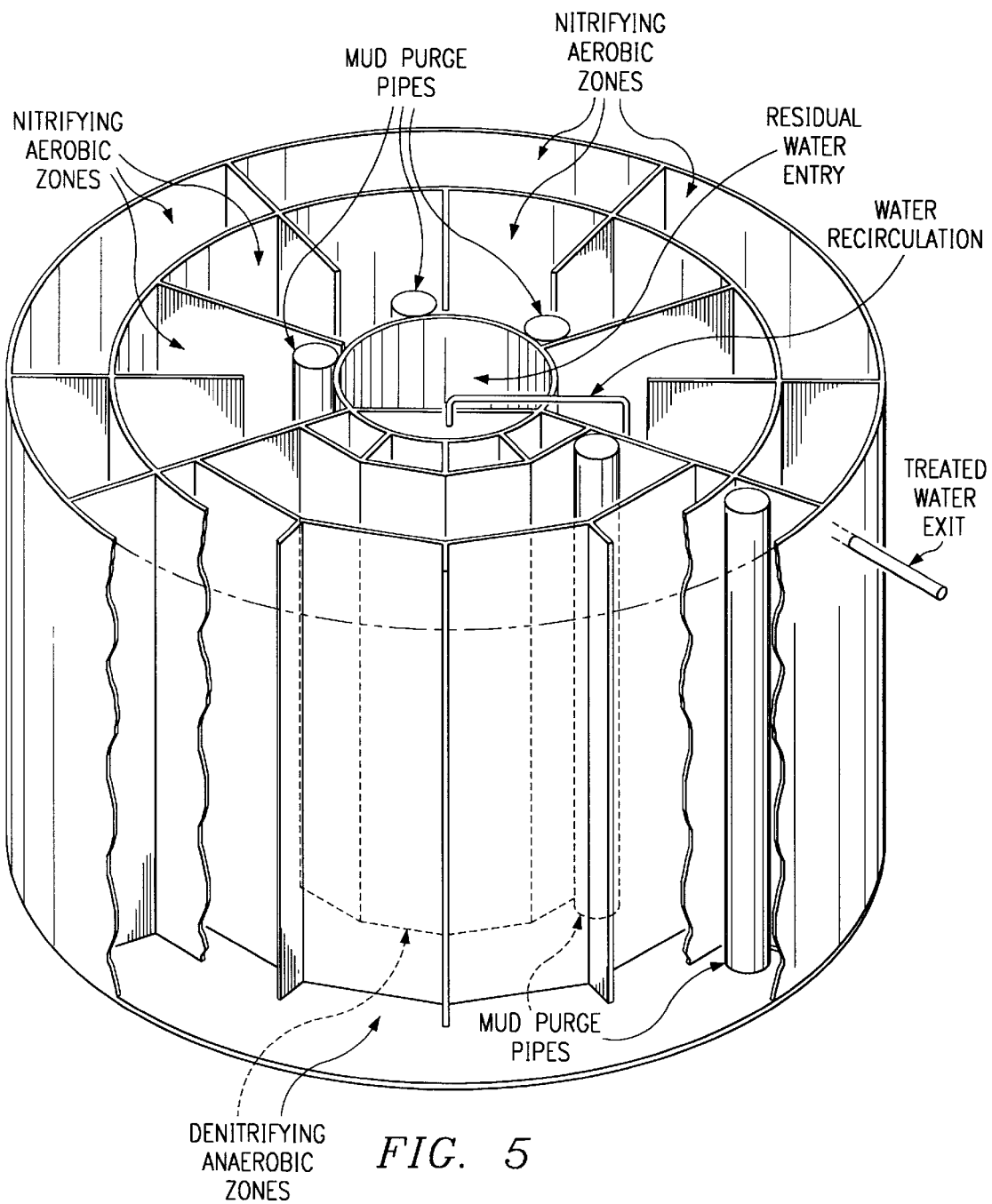
FIG. 5 shows a three-dimensional drawing of the microplant subject matter of this invention in its preferred geometry.

This invention refers to a residual water treatment microplant that produces treated water with enough quality for reutilization activities (for example, watering, washing automobiles, flushing sanitary facilities, washing floors, and so forth). The package microplant has 4 zones basically (FIGS. 3, 4 and 5), that is, water receipt zone (3,1), denitrifying anaerobic zone ((3,7) and (3,10)), a compartmentalized aerobic-nitrifying zone, in this case into 7 units (compartments of (3,11), (3,14), (3,15), (3,16), (3,17), (3,18) and (3,19), and a secondary sedimentation zone (3,24).

In this preferential arrangement, the septic pit residual water or effluent (FIG. 2) enters the microplant through the compartment (3,1) located at the center of the package plant, and which is designed to perform sedimentation and retention of suspended solids contained in the residual water (3,2). Fats and oils and floating solids will be trapped on the upper part of the same (3,3). The compartment (3,1) is divided by a partition (3,4) that permits floating material retention in the compartment (3,1) and a descending and ascending flow in the same compartment. The compartment (3,1) has the functions of a primary sedimentator. Water flows later into four registers (1,6) that have the function of distributing water homogeneously into the bottom of the following compartment (3,7). In the compartments (3,6) the water flow is descending and in (3,7) it is ascending. Compartment (3,7) is packed with material (3,8) that may be synthetic (plastic, ceramic, and so forth) or natural (stone, wood, and so forth), in which the biofilm of anaerobic and/or anoxic microorganisms is developed. They are responsible for the degradation of organic matter and the denitrification process. On the bottom of the compartment (3,7) there is accumulated a bed of anaerobic mud, which will also have the function of degrading organic matter and denitrifying. Due to this, compartment (3,7) is a combination of an anaerobic system of the mud-layer type, with a biofilm system, which increases its water treatment efficacy.

Elements (3,9) and (3,10) have the same function as registers (3,6) and compartment (3,7), respectively. By placing anaerobic compartments (3,7) and (3,10) in a series, the system tends to work with a piston flow, which is highly convenient for biological reactions described with first order kinetics. Besides, the piston flow diminishes dead zones inside the system.

After the anaerobic-denitrifying zone, the water flows to compartment (3,11), which is packed and aerated. Aeration is supplied by means of an air compressor (3,12) and a diffusing unit (3,13) placed on the compartment bottom (3,11), as well as in all other aerated compartments of this zone. Over the packaging surface there is a development of heterotrophic aerobic bacteria, and there are also nitrifying autotrophic bacteria, which will be the ones in charge, on the one hand, of degrading all of the organic matter remaining from the anaerobic compartments (3,7) and (3,10), and on the other hand, of oxidizing the ammonia nitrogen present in the water. Compartments (3,14), (3,15), (3,16), (3,17), (3,18) and (3,19) in this example possess the same features as (3,11). Compartments (3,14), (3,16) and (3,18) have an ascending flow and compartments (3,11), (3,15), (3,17) and (3,19), a descending one. Water flows below the division partitions (3,20), (3,21), (3,22) and 3,23) with the purpose of connecting compartments (3,11) and (3,14), (3,15) and (3,16), (3,17) and (3,18), and (3,19) and (3,24), respectively. On the contrary, water flows above the dividing partitions (3,25), (3,26) and (3,27) with the purpose of connecting compartments (3,14) and (3,15), (3,16 and 3,17), and (3,18) and (3,19), respectively.

The set of aeration chambers comprised from compartment (3,11) until (3,19) have a design such that it favors a flow pattern tending to a piston flow, which increases the treatment plant operation efficacy, and dead zones are diminished in the same.

Compartment (3,24) is a sedimentation chamber, where suspended solids generated in the aerobic compartments are generated. This compartment has a pipe (3,28), that serves to recycle treated water in a variable way (3,5). (It may be up to (3,1).

Recirculation is performed by means of a controlled air injection inside the tube or pipe, with the pumping principle by "air-lift" effect.

Water recirculation from compartment (3,24) to (3,5) (or to (3,1)) has a triple function. The first consists in recycling sedimented mud to the anaerobic compartment so that on the one hand accumulation of the latter will become easier in the anaerobic section during the start-up stage. On the other hand its cellular residence time in the plant will be increased, and thus its partial stabilization or digestion will be favored.

The second function of the recirculation current is to supply oxidized nitrogen to the denitrifying bacteria present in the anaerobic compartments (3,7) and (3,10), in order to reduce the oxidized nitrogen to harmless gas molecular nitrogen, at environmental level, and thus eliminate it from the water.

The third function consists in incorporating treated water with a low content of organic matter into the water coming from compartment (3,1), which allows for better control of the organic load applied to the plant and a dilution of the toxic compounds that might enter the plant. The only electromechanical equipping the treatment plant needs is the compressor (3,12), and an adequate distribution of the air in the package plant is accomplished through adjustment of the valves (3,29) installed in the air pipes. This disposition permits control over the oxygenation of the aerobic compartments, according to oxygen requirements in long periods of time without substrate feeding, as well as the flow in the "airlift" system.

The package plant effluent is obtained in the pipe or tube (3,30), whose arrangement allows for floating solid retention.

Figure 6:
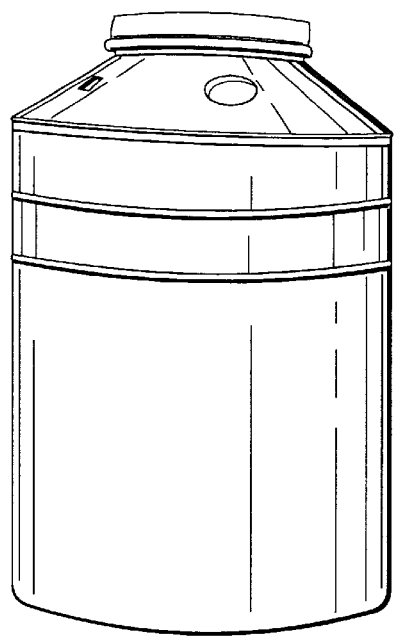
FIG. 6 shows a photograph of the prototype used to evaluate treatment plant functioning.
Figure 7:
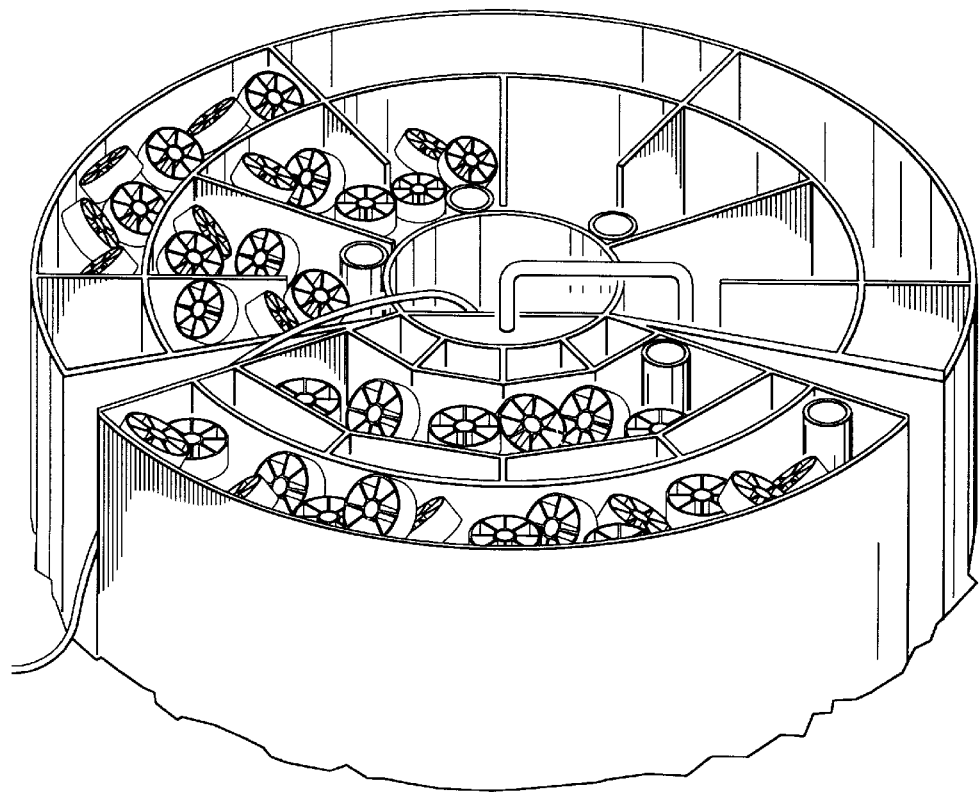
FIG. 7 shows a photograph with part of the interior of the prototype of the microplant, which prototype was employed to evaluate its functioning.

FIGS. 6 and 7 show photographs of the residual water treatment microplant prototype.

Aeration

In the preferred arrangement, the compressor (4,12) feeds 5 aeration zones in cylindrical formation, distributed homogeneously in the aerated zone of the treatment plant. For such purpose, a minimum of 5 air diffusers may be used, placed on the bottom of the compartments. Any diffuser that provides a fine bubble may be used as an air diffuser.

A sixth air injection zone is located in the "Airlift" type water recirculation pipe or tube (4,28). Air supply, which varies between 40 and 100 l/min (1 atm and 20° C.), preferably 80 l/min, keeps a dissolved oxygen concentration in the aeration chambers within a concentration interval between 2 and 6 mgO2/L. This allows for maintaining oxygen concentrations sufficient for degradation of organic matter and nitrifying, but at the same time, not affecting denitrification in the anaerobic compartments (4,7) and (4,10) through water recirculation between the aerobic and anaerobic zones (4,28). Oxygenation of the aerobic zones ((4,11), (4,14), (4,15), (4,16), (4,17), (4,18) and (4,19) may be controlled to adjust oxygen supply as a function of its demand. With this operation costs are reduced and there is a better control over the impact there could be in anoxic zones (4,7) and (4,10).

Figures 8, 9:
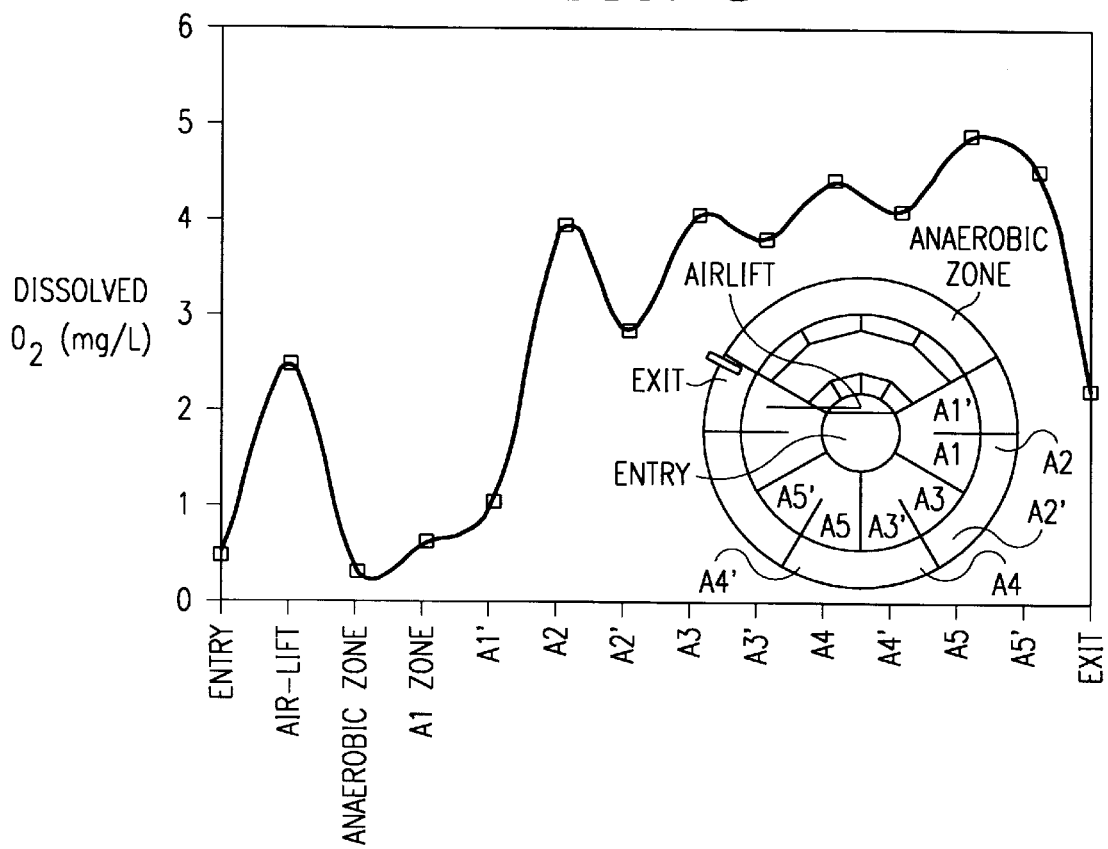
FIG. 8 expounds the oxygen concentration profile dissolved in various points of the prototype, at a permanent regime operating with a flow of 1 m3/d and an internal recirculation of 2 m3/d at a temperature of 18° C. On the graph there is a plant view of the treatment plant, indicating the sampling points corresponding to the abscissas.
FIG. 9 presents the flows used throughout the experimentation where the functioning of the treatment microplant prototype was proved.

FIG. 8 shows the profile of the concentration of dissolved oxygen obtained in the operation of the residual water treatment microplant.

Internal Water Recirculation By Means of an "Airlift" Type System

One of the main control elements in the treatment plan operation turns out to be the water recirculation rate between the aerated and anaerobic zones. The nitrogen elimination capability will depend on this rate. The preferred design of the package plant fixes a recirculation rate of 2:1, although this could vary within an interval between 0.5:1 to 4:1.

With this recirculation relationship it is possible to supply oxidized nitrogen to the denitrifying anaerobic zones (4,7)

and (4,10), without causing greater inhibition problems, due to the action of the oxygen contained in the recirculation current (4,28).

One of the economic options to activate water internal recirculation is the use of air ("Airlift"), since there is a compressor already and thus the use of a bomb or additional rotatory equipment is avoided. This would complicate the plant's operation, although it is also feasible for use in this invention.

The "Airlift" system operation is the preferred system, depending on the diameter of the tubing used to transport recycling water, water flow and the water brace being managed. The water recirculation pipe or tube may have a diameter of between ½ and 2 inches, the preferred one being one inch.

Suspended and Dissolved Organic Matter Removal

In order to show the functioning of the treatment microplant subject matter of this invention, a prototype (FIG. 6) of the same was built and operated, which was submitted to different residual water discharges. The residual water used on such experimentation was domestic. The discharges are specified in FIG. 9. Within the experimentation, the prototype was submitted to a discharge variation typical of that produced in a house among 5 or 10 people, which was designated "simulation" on FIG. 9.

Figures 10, 20:
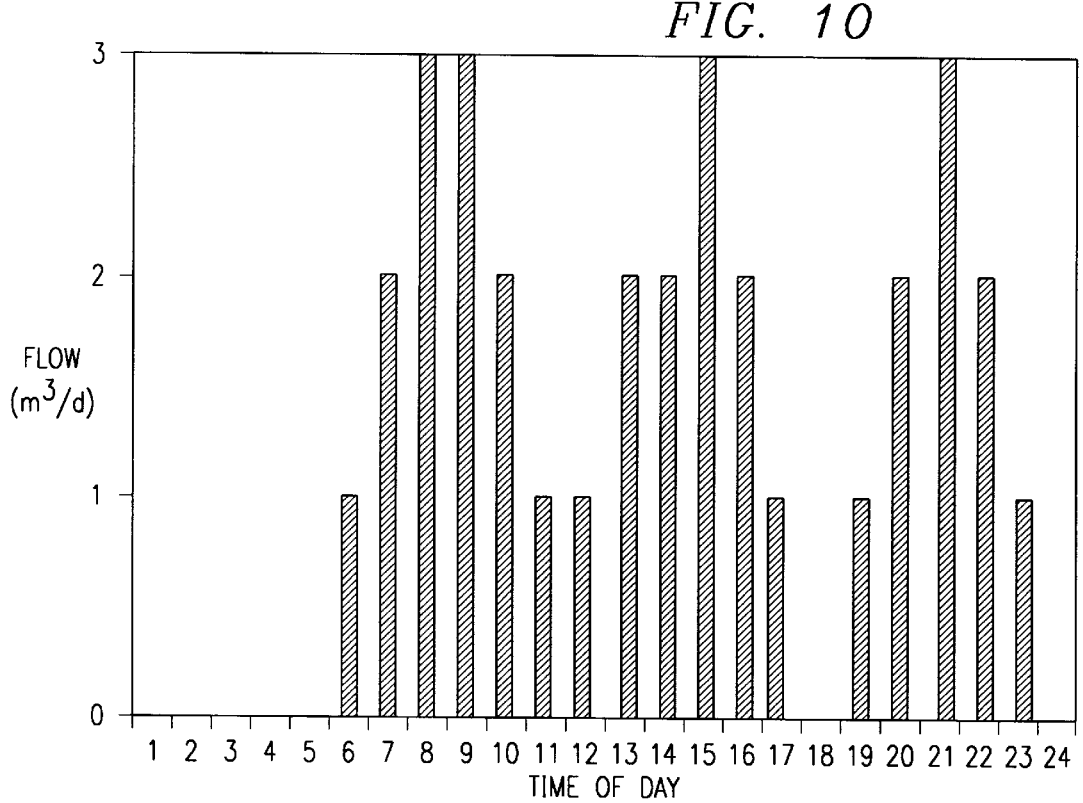
FIG. 10 shows the profile of flows used to simulate a residual water unloading profile in a house, which was applied in one stage of the experimentation to evaluate the functioning of the treatment microplant prototype subject matter of this invention.
FIG. 20 shows the average results for operation of the treatment microplant without the action of the air compressor. Anaerobic operation.

FIG. 10 shows the profile corresponding to such simulation. FIGS. 11, 12, 13, 14, 15 and 16 present the graphs corresponding to variation and efficacy of removal of DQOt, DQOs and SST as a function of the discharges used.

Figure 12:
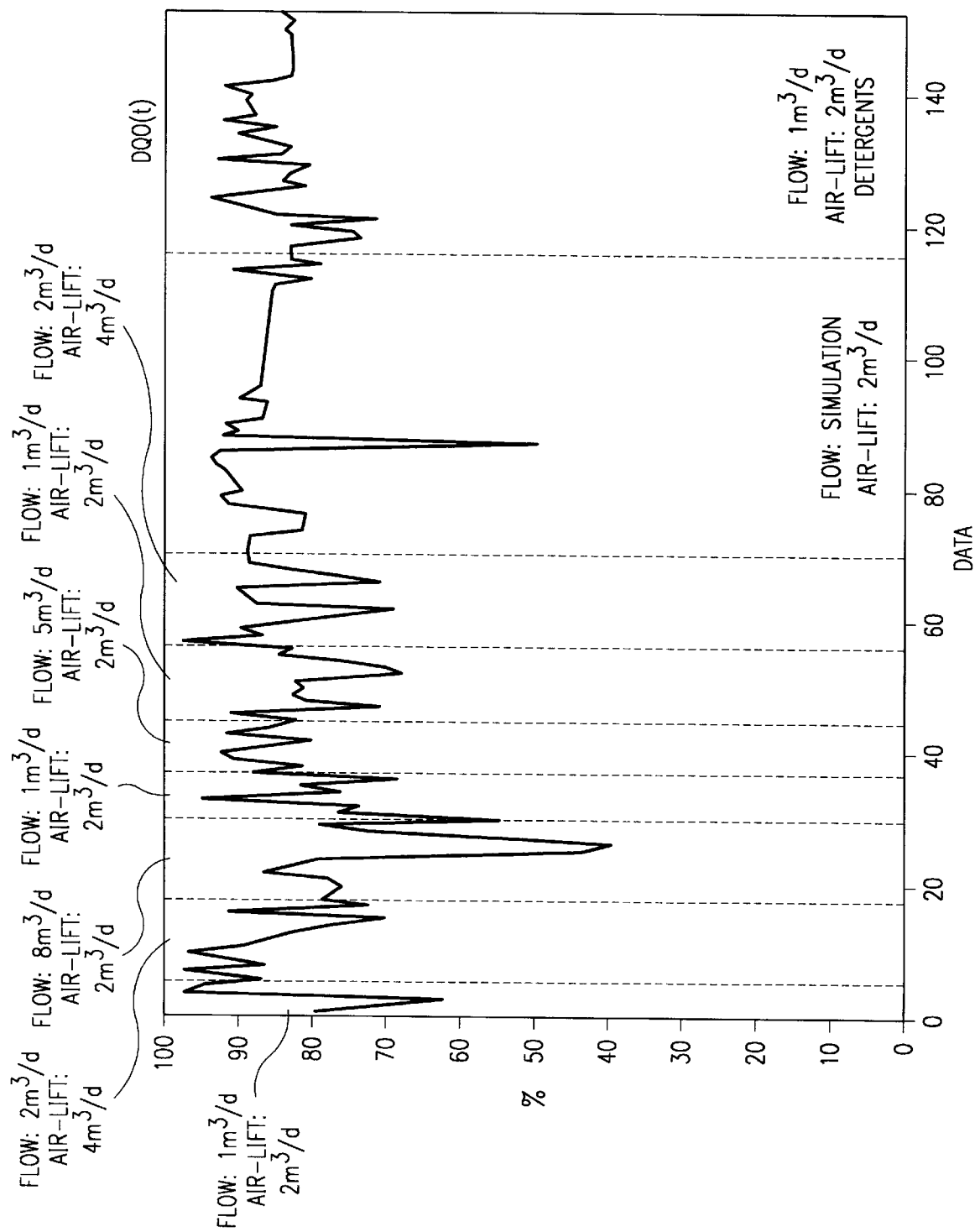
FIG. 12 shows the removal efficacy of the DQOt as a function of the discharge variation.
Figure 13:
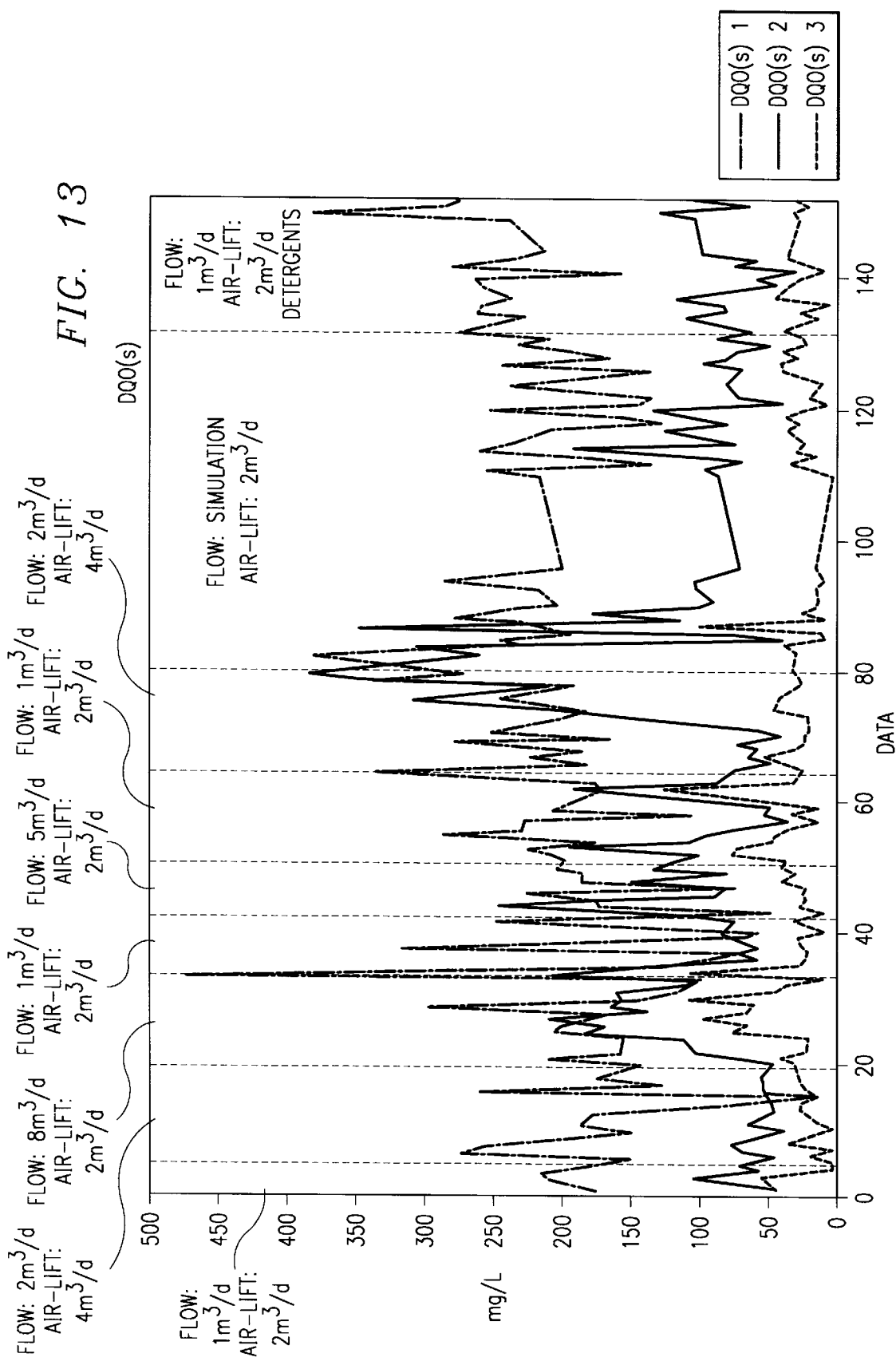
FIG. 13 presents the variation of DQOs in the influent to the treatment plant (1), in the effluent of the anaerobic filters (2), and in the treated water exit (3) as a function of the discharge variation.
Figure 14:
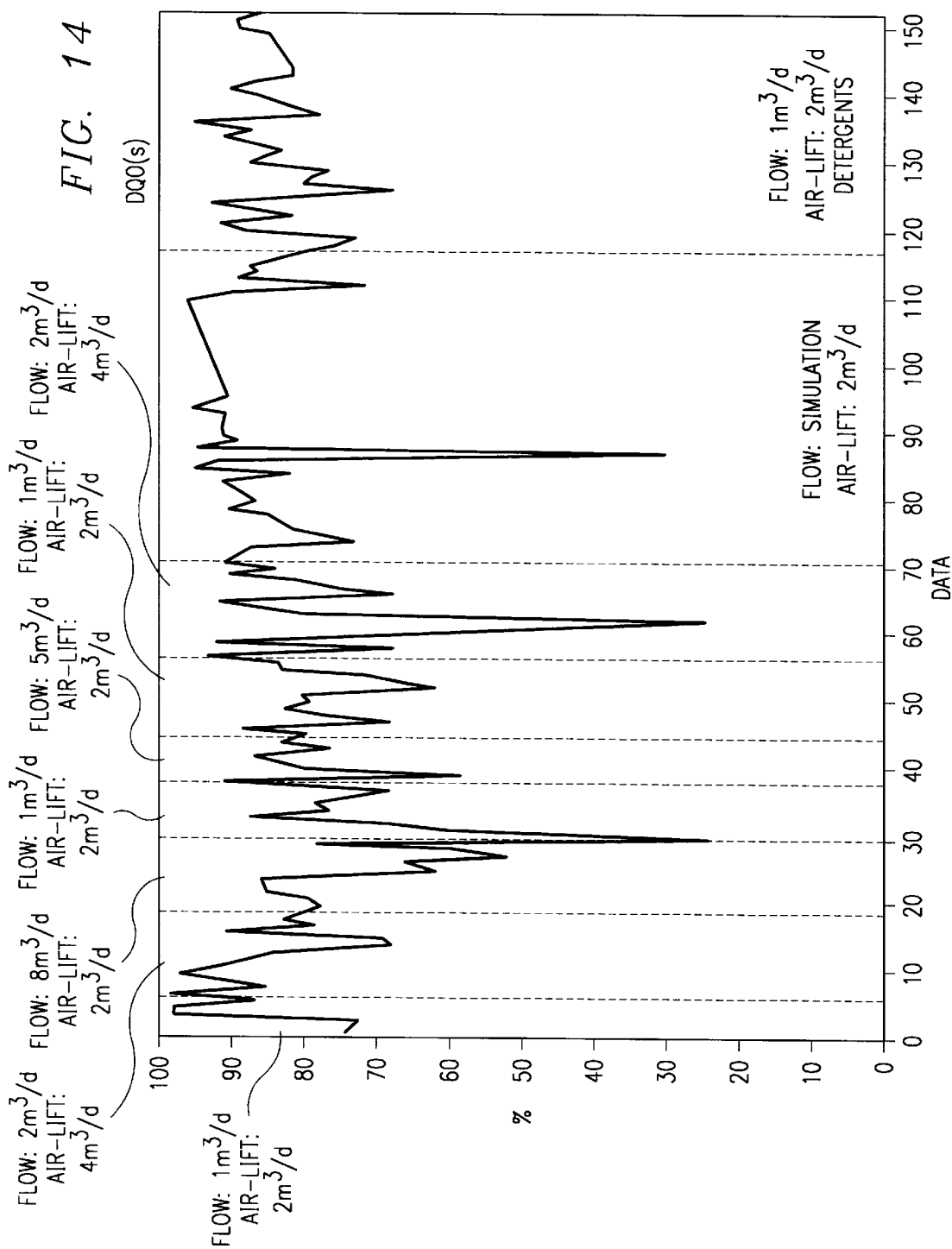
FIG. 14 shows the removal efficacy of the DQOs as a function of the discharge variation.

As it is possible to observe on FIG. 12, the DQOt removal efficacy, for the 1 m3/d flow, is above 90%. Experiments were made with double the amount of the design flow, by keeping the recirculation rate constant at 1:2, where an average removal efficacy of 80% was observed.

Figure 15:
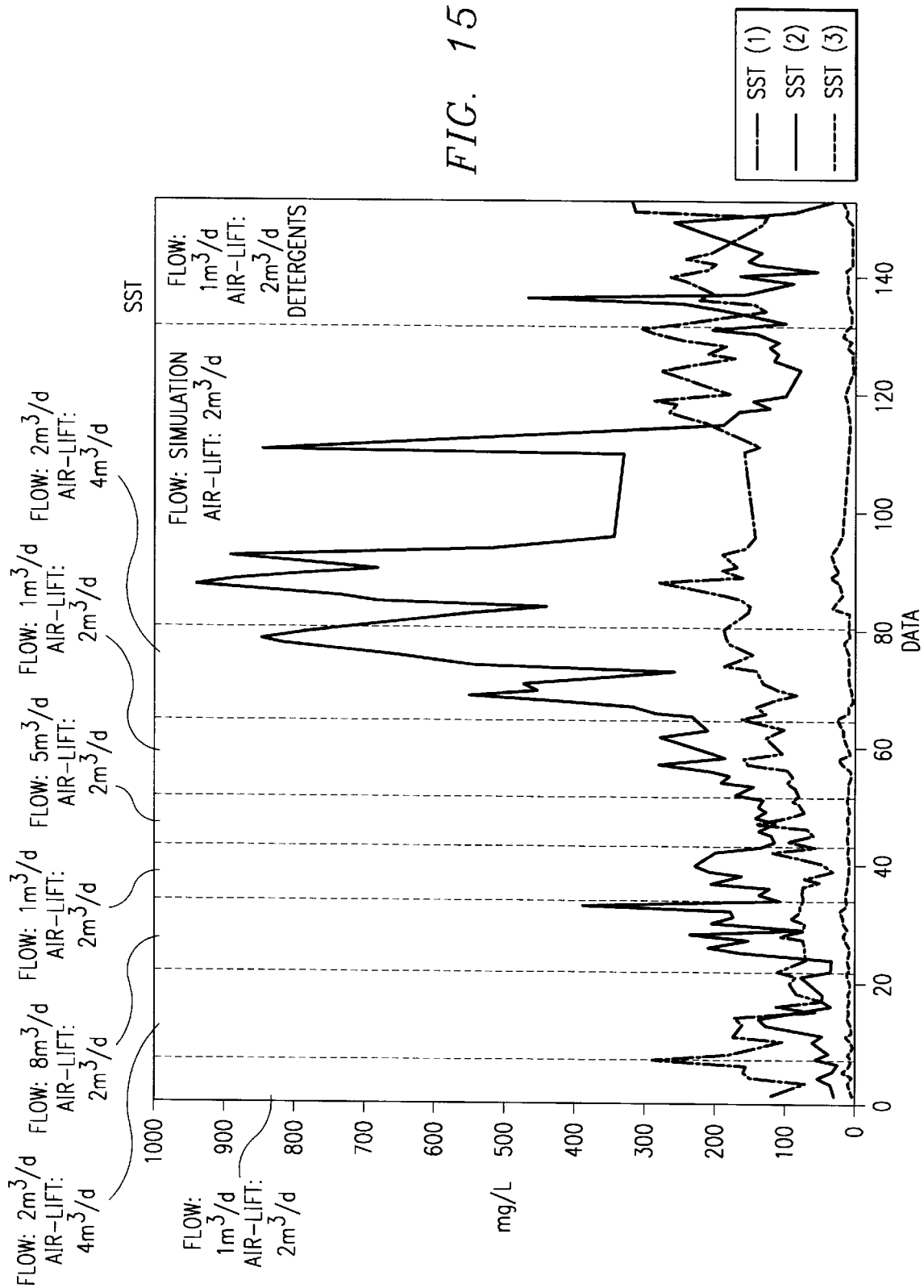
FIG. 15 presents the SST variation in the influent to the treatment plant (1), in the effluent of the anaerobic filters (2), and in the treated water exit (3) as a function of the discharge variation.
Figure 16:
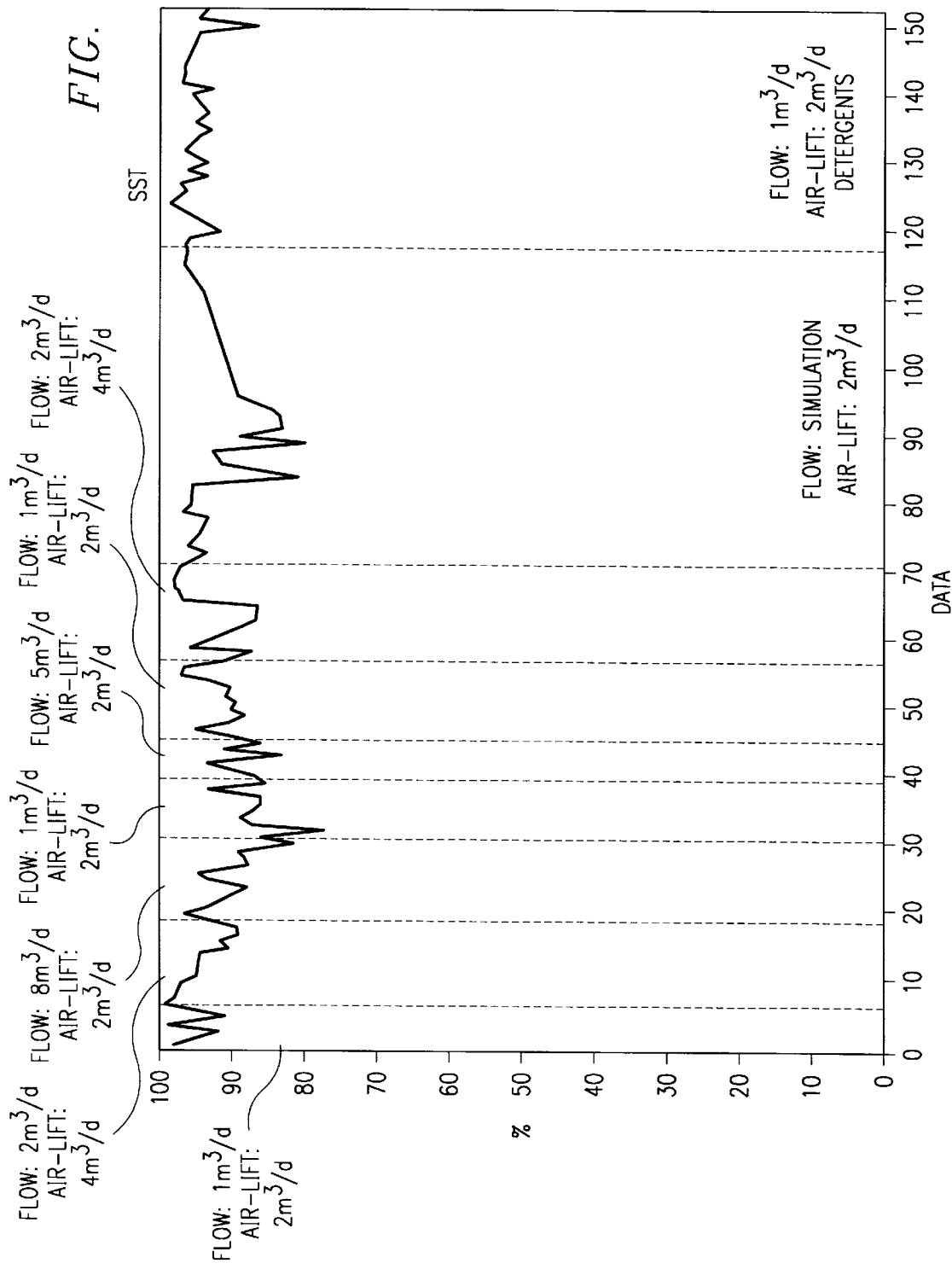
FIG. 16 shows the SST removal efficacy as a function of the discharge variation.

In the following experiment, the plant was submitted to a high hydraulic load corresponding to 8 times the hydraulic load for which it was designed, thus obtaining a DQOt elimination average of 65% and with reductions in the DQOt removal efficiency of up to 40%. The SST elimination percentage, independently from the flow condition used, except for that of 8 m3/d, was higher than 90%. In FIG. 15 it is possible to observe an exponential increase in the solid concentration in the effluent (2), corresponding to exit from the denitrifying zone. This is explained by the accumulation of solids in the compartment after 6 months of operation. The plant was purged at that time, which was reflected on the sudden decrease in SST concentration at the exit of the denitrifying zone. The treatment microplant behavior with the simulation flow of water corresponding to a residential house was similar to the behavior presented with the flow of 1 m3/d. This implies that the treatment microplant has the capability of absorbing brusque variations in discharge and organic load. This is an essential requirement for application of the plant in a residential house, for example.

During the final phase of experimentation, the plant's response was evaluated regarding the removal of DQOt in the presence of detergents. For this a detergent amount equivalent to double what is used for a domestic washing machine was utilized. Under these conditions, DQOt removal was not sensitively affected.

Nitrogen Removal

Figure 17:
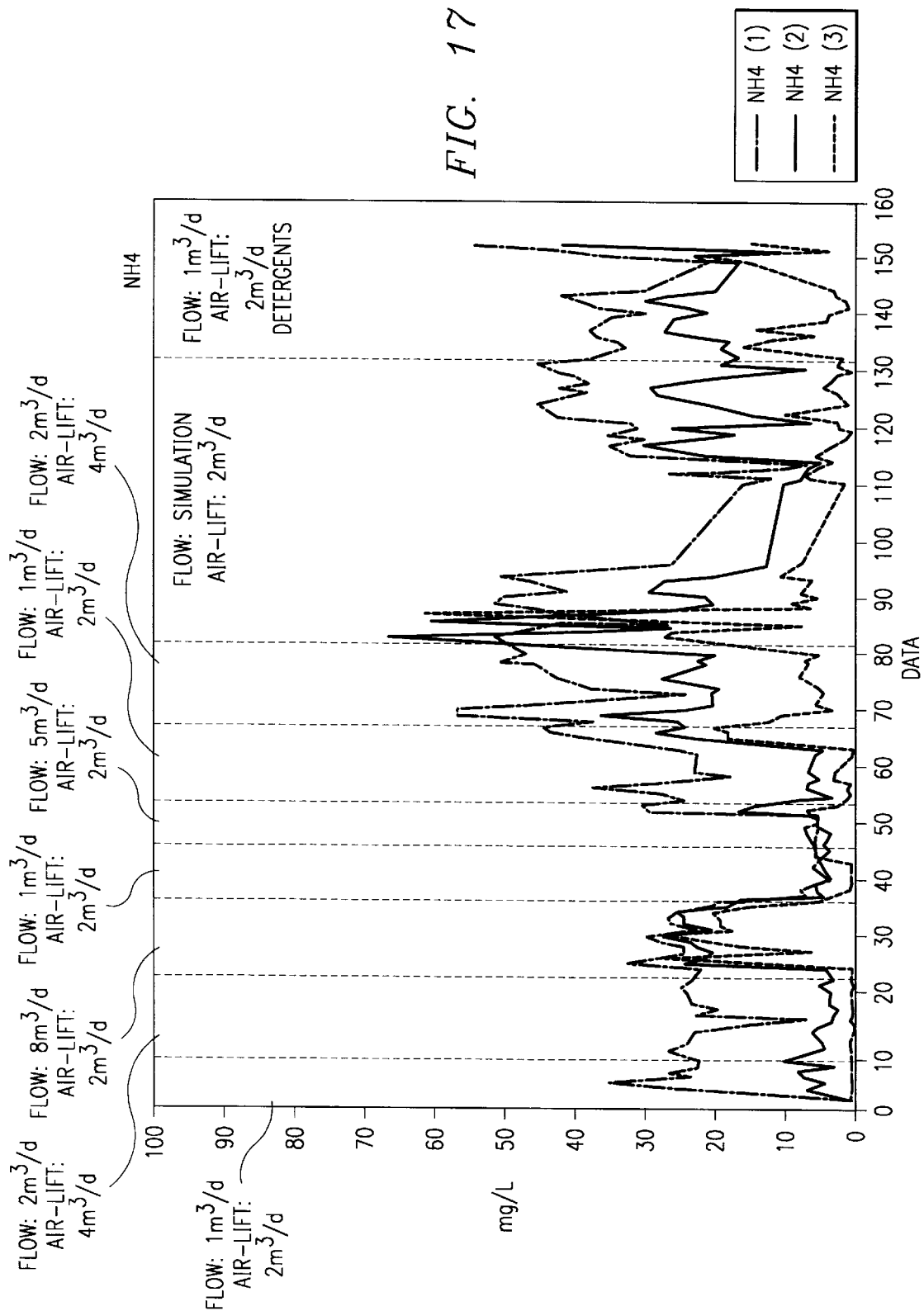
FIG. 17 presents the ammonia nitrogen variation in the influent to the treatment plant (1), in the effluent of the anaerobic filters (2), and in the treated water exit (3) as a function of the discharge variation.
Figure 18:
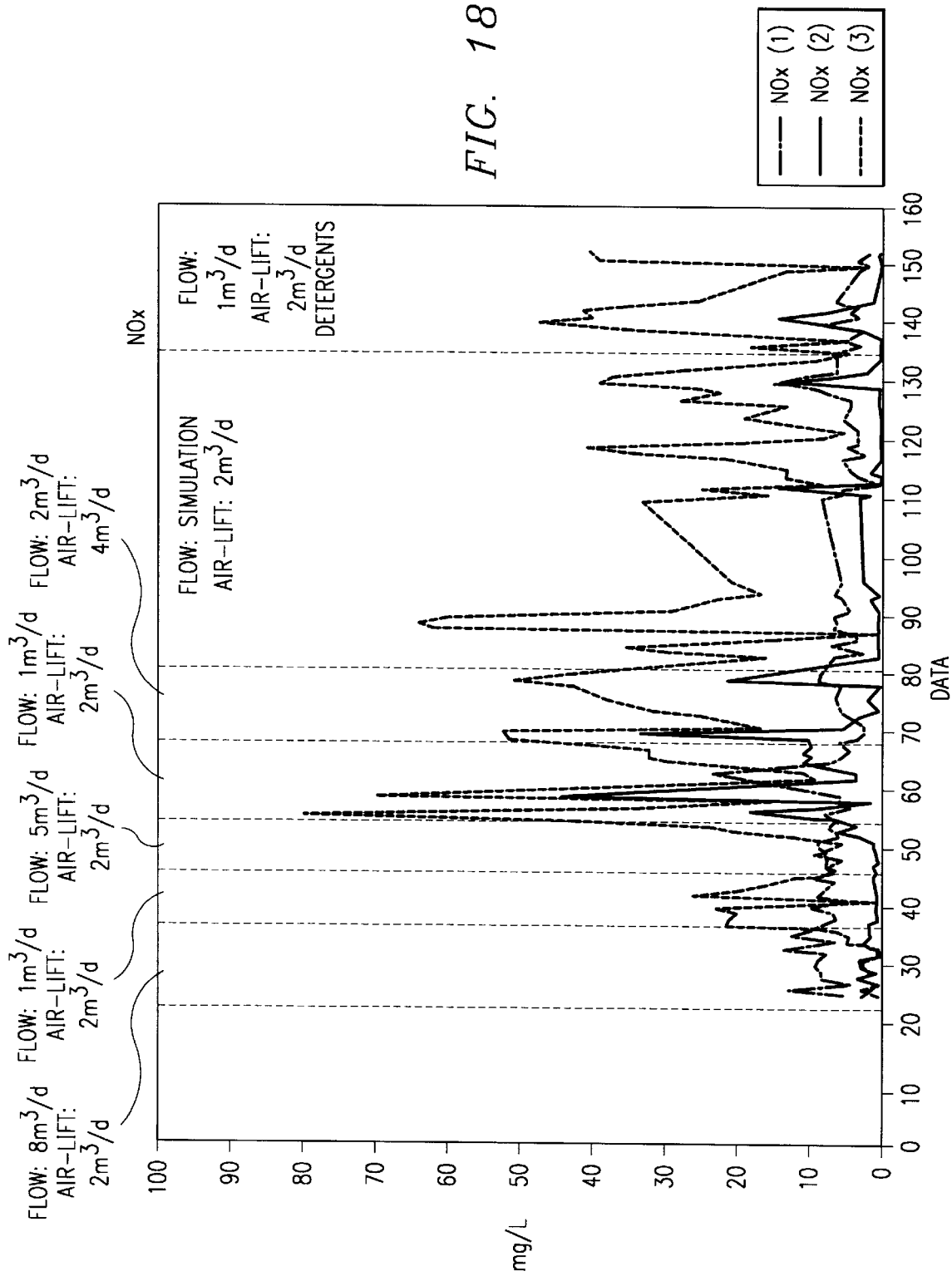
FIG. 18 presents the oxidized nitrogen variation in the influent to the treatment plant (1), in the effluent of the anaerobic filters (2), and in the treated water exit (3) as a function of the discharge variation.

Nitrogen elimination is performed through interaction between the aerobic and anaerobic zones of the treatment microplant, effected by water recirculation. For the 1 m3/d flow, N—NH4+ removals appeared, close to 100%, even for a flow of 2 m3/d. However, and as is to be expected, nitrification capability deteriorates when managing fluids as high as 8 m3/d (FIGS. 17 and 18). For a flow of 1 m3/d, in the treated water N—NH4+ concentrations are obtained that are lower than 5 mg/L and an oxidized nitrogen concentration (N—NO3-+N—No2-) lower than 20 mg/L. The concentration of oxygen dissolved in the aerobic chambers oscillated between 2 and 4 mg/L. Global removal of total nitrogen in the plant was found to be between 60 and 70% for that same discharge. A greater recirculation flow would increase these values in principle, but would also incorporate more dissolved oxygen into the anoxic zones, which would affect denitrification. Oxygen concentration in the aerobic chambers evidently favors the removal process of organic matter and nitrification. However, due to the connection with the denitrifying zone, the aerobic chamber should not be supersaturated with oxygen. This affects, through water recirculation, the denitrification process, essential for global nitrogen removal.

In general terms, the plant is capable of removing nitrogen even when submitted to strong variations in discharge and organic load.

Dissolved O2 Variation

FIG. 19 shows the variation in dissolved O2. Oxygen dissolved in the aerobic zone was supplied and controlled by the diaphragm compressor, which proved to be the best option available due to its low maintenance, absence of noise and efficacy, although its cost is high.

On the other hand, handling detergents did not affect treatment plant operation. To the influent were added unloadings of 105 and 210 g of detergent. The doses may represent the detergent load applied to conventional domestic washing machines. The detergent was added at 10:00 a.m. on Tuesday and Thursday of each week. Work was done with a 1 m3/d flow and 2 m3/d recirculation.

Mud Production

The treatment plant accumulates sedimented and suspended mud at the rate of 0.5 to 1.5 kg dry base of mud/month in all treatment chambers, considering a residential house with 5 to 10 inhabitants. The mud should be purged approximately every 6 to 12 months, if considering a continuous operation of the treatment plant with domestic residual water. Purge of the mud accumulated in the treatment plant is carried out by emptying the total contents of water of the plant through the pipes or tubes (3,31) installed in the compartments (3,7), (3,10), (3,14), (3,16) and (3,18). These pipes or tubes permit introduction of the suction tubing of a pump down to the bottom of the plant without having to withdraw the packing material of the compartments. This way it is possible to empty the water contents in all of the compartments, except compartment (3,1), which does not require tubing to be emptied.

Operation Without Aeration

When suspending the air provided by the compressor, we are preventing oxygenation of the aerobic zone, which thus becomes an anoxic zone and then an anaerobic zone. Besides, water recirculation (3,28) stops operating. During three months the treatment plant was worked without the compressor action, where the treatment process was transformed into a water receipt zone, in an anaerobic filter with 7 zones placed serially (2 that it already contained, plus the 5 aerobic ones being transformed into anaerobic) and in secondary sedimentator. The average pollutant removal efficacy is shown on FIG. 20. The plant was operating with a flow of 1 m3/d without water recirculation.

When comparing the results of a net anaerobic operation with the treatment plant operation of the preferred design, we can appreciate the advantage of maintaining aeration in the system. However, if for any reason the compressor should fail and its fixing or replacement should take some time, it is possible to expect a behavior similar to that reflected on FIG. 20. The plant, under this circumstance, would not stop operating at any time, although it would do so with a lower efficacy. It is also feasible to use the treatment microplant considering only the net anaerobic operation, keeping the geometry and compartmentalization preferred.

Practical Example of Application With a Preferred Configuration

Residual water type to be treated:

Domestic residual water

Residential house with 5 to 10 inhabitants

Estimated residual water discharge: 1 to 1.5±1 m3/d

Organic matter concentration measured as total DQO: from 500 to 1500 mgO2/L

Total suspended solid concentration: from 200 to 600 mg/L

Ammonia nitrogen concentration: (N—NH4+): from 80 to 100 mg/L

Oxidized nitrogen concentration: (N—NO3-+N—NO2-): 0 mg/L

Dissolved O2 concentration: 0 mg/L

Residual water is a Mixture of water coming out of sanitary facilities, sinks, bathrooms, kitchens and effluents of washing machines.

Treatment Process Arrangement

The process consists of a conventional septic pit (1 m3), the package plant in question, a disinfectant unit and a treated water cistern (1 m3) (FIG. 2). The dimensions of the microplant are as shown on Table 2:

TABLE 2

| TITLE | VALUE |
|---|---|
| Water Level | 1.10 m |
| Height | 1.50 m |
| Area | 1.30 m2 |
| Volume | 1.95 m3 |
| Volume of water receipt zone (Number 1 in FIG. 4) | 0.43 m3 |
| Volume of the first aerobic zone (Number 7 in FIG. 4) | 0.28 m3 |
| Volume of the second aerobic zone (Number 10 in FIG. 4) | 0.30 m3 |
| Volume of aerobic zones Numbers 11, 15, 17 and 19 (FIG. 4) | 0.32 m3 |
| Volume of aerobic zones Numbers 14, 16 and 18 (FIG. 4) | 0.43 m3 |
| Volume of sedimentation zone (Number 24 in FIG. 4) | 0.19 m3 |
| Water recirculation flow (Number 28 in FIG. 4) | 2 m3/d |
| Air flow supplied by the compressor (Number 12 in FIG. 4) | 60 l/min (1 atm and 20° C.) |
| Mud purge frequency | Every 6 months |

Treated Water Quality

The treatment microplant produces treated water with the following characterization:

Organic matter concentration measured as total DQO: less than 60 mgO2/L

Total suspended solid concentration: less than 20 mg/L

Ammonia nitrogen concentration (N—NH4+): less than 10 mg/L Oxidized nitrogen concentration (N—NO3-+N—NO2-): between 25 and 35 mg/L Dissolved O2 concentration: greater than 2 mg/L After having described the invention, we claim the following as our own:

1. A microplant for water treatment comprising:
    a primary sedimentation compartment divided by a partition permitting retention of floating material in such compartment, and designed to permit descending and ascending flow of the water in the compartment;
    an anaerobic zone, containing a denitrifying anaerobic biomass, connected to the primary sedimentator compartment in such a manner as to receive water exiting the primary sedimentator compartment;
    an aerobic zone, containing a nitrifying aerobic biomass, connected to the anaerobic zone in such a manner as to receive water exiting the anaerobic zone;
    a secondary sedimentation zone connected to the aerobic zone in such a manner as to receive water exiting the aerobic zone.

2. The microplant of claim 1 wherein the anaerobic zone comprises first and second anaerobic compartments disposed sequentially.

3. The microplant of claim 1 wherein the aerobic zone comprises first and second aerobic compartments disposed in parallel.

4. The microplant of claim 1 wherein the aerobic biomass comprises heterotrophic aerobic bacteria and nitrifying autotrophic bacteria.

5. The microplant of claim 1 wherein the aerobic biomass comprises heterotrophic aerobic bacteria.

6. The microplant of claim 1 further comprising one or more vertical tubes in one or more of the anaerobic and aerobic zones, wherein the anaerobic and aerobic zones are constructed to permit introduction of the suction tubing of a pump to the bottom of the one or more anaerobic and aerobic zones.

7. The microplant of claim 1 further comprising a controlled air injection apparatus disposed so as to generate a recirculation current from the primary sedimentation compartment to the anaerobic zone.

8. The microplant of claim 1 further comprising an air compressor and one or more valves connected to the aerobic zone in such a manner as to allow for control of the oxygenation of the aerobic zone.

9. The microplant of claim 1 further comprising an apparatus for recirculating treated water into the primary sedimentation compartment with air, permitting simultaneous sedimented mud to be pumped to oxidize the nitrogen supply, and to dilute the influent organic loads entering the treatment plant.

10. The microplant of claim 1 further comprising one or more tubes or pipes inserted into one or more of the anaerobic and aerobic zones for purging mud accumulated in the treatment plant.

11. The microplant of claim 1 further comprising a controller to regulate the oxygenation of the aerobic zone according to the oxygen requirements of the zone.

12. A method for treatment of waste water comprising:
    retention of waste water in a divided primary sedimentation compartment for a sufficient period of time to allow for sedimentation of suspended solids contained in the water, and to trap fats, oils, and floating solids in the upper part of the compartment;
    diversion of water from the sedimentation compartment into an anaerobic zone having a biofilm of anaerobic and/or anoxic microorganisms suitable for organic matter degradation and denitrification of the water;
    diversion of water from the anaerobic compartment to an aerobic zone containing heterotrophic and autotrophic nitrifing aerobic bacteria suitable for degrading organic matter and oxidizing ammonia nitrogen in the water; and diversion of water from the second aerobic compartment to a secondary sedimentation compartment.

13. The method of claim 12 wherein the anaerobic zone comprises two or more separate compartments disposed sequentially.

14. The method of claim 12 wherein the aerobic zone comprises two or more separate compartments disposed sequentially.

15. The method of claim 12 further comprising the step of generating a recirculation current from the primary sedimentation compartment to the first anaerobic compartment using air injection.

16. The method of claim 12 further comprising the step of controlling the oxygenation of the aerobic compartment using an air compressor and one or more valves connected to the aerobic compartment.

17. The method of claim 12 further comprising the step of recirculating treated water into the primary sedimentation compartment with air, permitting simultaneous sedimented mud to be pumped to oxidize the nitrogen supply, and to dilute the influent organic loads entering the treatment plant.

18. The method of claim 12 further comprising the step of regulating the oxygenation of the aerobic compartment according to the oxygen requirements of the compartment.

* * * * *